Figure 1:
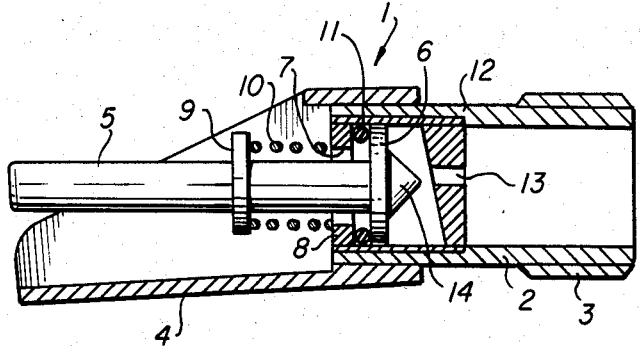

United States Patent [19]

Ove et al.

[11] Patent Number: 4,633,816
[45] Date of Patent: Jan. 6, 1987

[54] DEVICE FOR CONTROLLED DISCHARGE OF LIQUID TO ANIMALS

[75] Inventors: Olsson Ove; Olsson Ingegärd, both of Sätofta, Sweden

[73] Assignee: Ove Olsson and Ingegärd Olsson, Sweden

[21] Appl. No.: 706,859

[22] Filed: Jan. 24, 1985

[30] Foreign Application Priority Data

May 24, 1983 [SE] Sweden ................................ 8302924

[51] Int. Cl.$^4$ ............................................... A01K 7/00
[52] U.S. Cl. ...................................... 119/72.5; 119/75
[58] Field of Search .................................. 119/72.5, 75

[56] References Cited

U.S. PATENT DOCUMENTS

| 1,454,284 | 5/1923 | Holmes | 119/72.5 X |
| 1,493,329 | 5/1924 | Everts | 119/75 |
| 2,319,928 | 5/1943 | Hart | 119/75 |
| 3,527,193 | 9/1970 | Smith | 119/72.5 |
| 4,402,343 | 9/1983 | Thompson et al. | 119/72.5 |

FOREIGN PATENT DOCUMENTS 1915212  8/1970  Fed. Rep. of Germany ..... 119/72.5

Primary Examiner—Hugh R. Chamblee
Attorney, Agent, or Firm—Witherspoon & Hargest

[57] ABSTRACT

A drinking valve (40) for supplying animals with water. This valve has an actuating member (46) accessible to the animal which when actuated opens a flow path for the liquid through the drinking valve (40). In the non-actuated position the flow path through the drinking valve (40) is completely closed and in the position of maximum actuation the flow path is strongly restricted or completely closed. In the intermediary position the drinking valve (40) yields the amount of water which the flow path is intended to produce. The actuating member (46) is connected to main closing valve (47, 49) which in turn actuates a secondary restricting or closing valve (53, 54).

8 Claims, 9 Drawing Figures

DEVICE FOR CONTROLLED DISCHARGE OF LIQUID TO ANIMALS

The present invention relates to a device for controlled discharge of liquid, preferably water, to animals, and specifically to a so-called drinking valve adapted to be operated by an animal to dispense the water which the animal wants to drink.

Many embodiments of such drinking valves are conceived for various species of animals and various types of water supply systems. Examples of such valves are the so-called biting valves, button valves and nose valves. All these various types of drinking valves are well-known to animal breeders and any person having some knowledge on this field will appreciate that the invention is applicable to all types of valves. However, hereafter the invention will be described as applied to so-called biting valves.

With increasing progress in the research dealing with the importance of water supply and water-dispensing methods for domestic animals it has been found that these factors directly influence the production of the domestic animals. Generally, it may be said that unlimited supply of fresh water is necessary for optimum yield. Such a water supply, however, must not involve any drawbacks of importance for the behaviour and cleanliness of the animals or leading to other problems and possibly being due to the dispensing technique.

With these problems in mind various types of drinking valves have been developed such as those exemplified above. These valves, to a great extent, have replaced and sometimes complemented the previously generally used troughs. To enable these drinking valves to produce sufficient amounts of water, the closing valves enclosed therein have been of a more or less sophisticated design. In spite of this, these drinking valves have not always produced the intended impvovement. The greatest problem, viz. spillage, has in many cases been equally grave as in older types of water supply devices. Obviously spillage has been large in particular in troughs as the drinking animal during drinking dips the nose, the snout, the mouth up and down in the trough causing the water to splash.

Modern drinking valves are conceived to be introduced into the mouth of the animal causing the water to flow down directly into the throat. Animals often tends to play with these valves holding them actuated without drinking and causing the water to flow out of the animal's mouth; as in many cases the water to discharge is larger than the drinking capacity of the animal, water also in this case will flow out of the mouth. Exceptionally it may happen that the animals actuate the drinking valves in such an improper way that all the water discharged will flow directly onto the floor.

Thus, spillage of water is the problem to be avoided in the first place as it is responsible for bad environment and thus bad hygienic conditions for the animals. Moreover it has shown that the refuse from stables, i.e. litter, urine, manure and the like as removed will contain such spillage water in amounts between 20 and up to 70 percent. Thus, this means, that a great amount of unnecesssary refuse must be handled at unnecessary expenses. Moreover, there are the costs for large amounts of water which do not serve any useful purpose but properly must be considered as a risk for the animals' health.

For both economical and production reasons and last not least health reasons it is obviously desirable to minimize the amount of spillage water to the greatest possible extent.

The present invention is intended to comply with this requirement. This purpose is achieved by a valve construction of the type indicated in the claims which also indicate the characteristic features of the invention.

Figure 2:
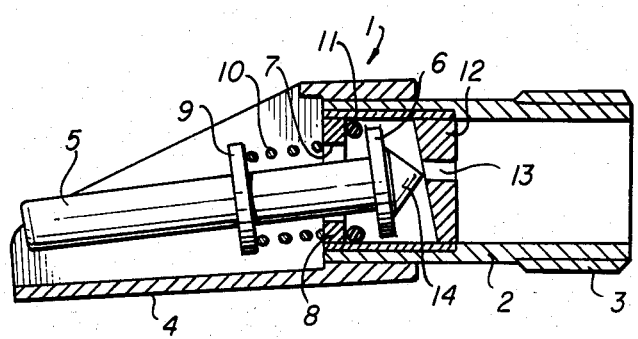
Figure 3:
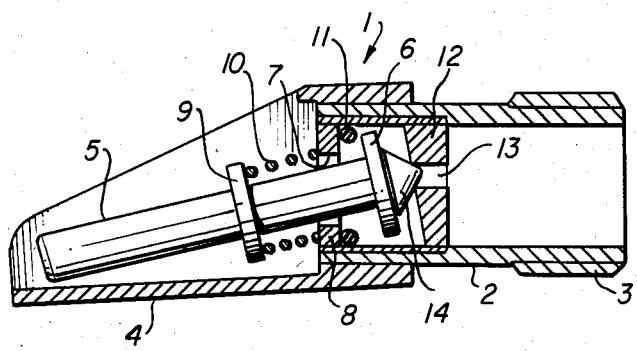
Figure 4:
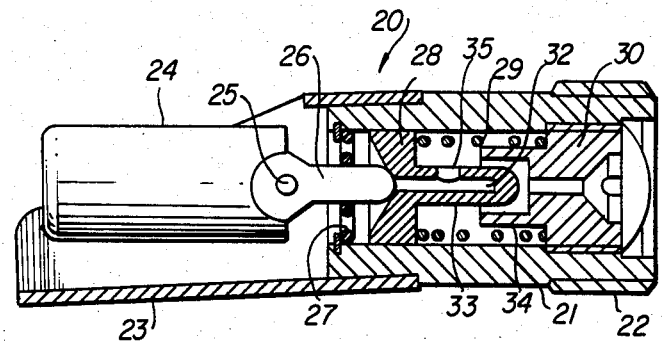
Figure 5:
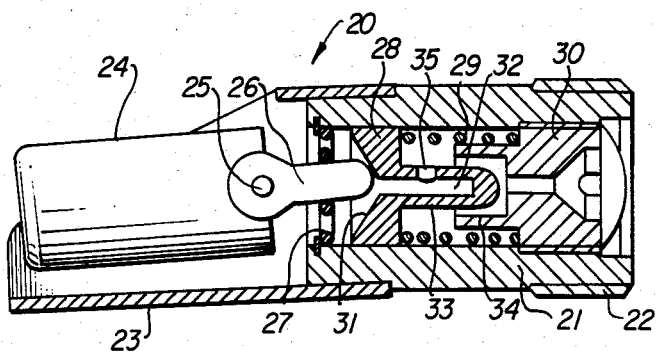
Figure 6:
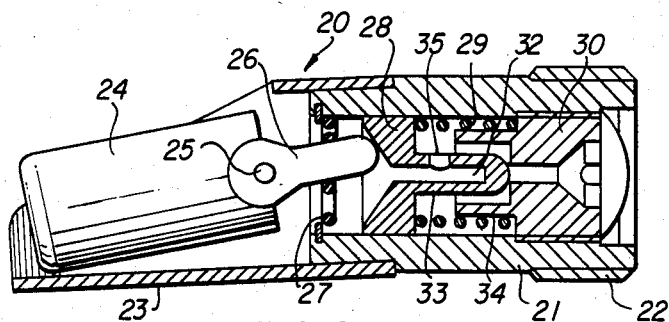
Figure 7:
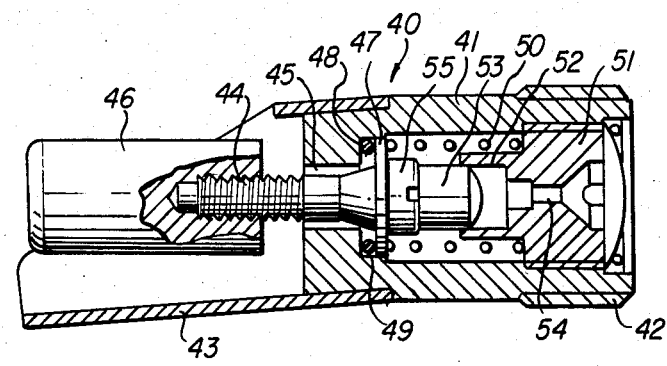
Figure 8:
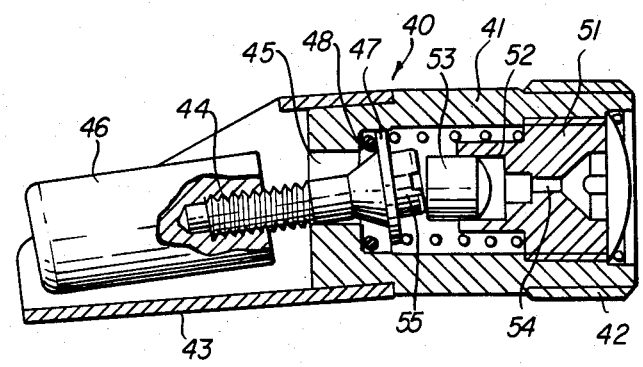
Figure 9:
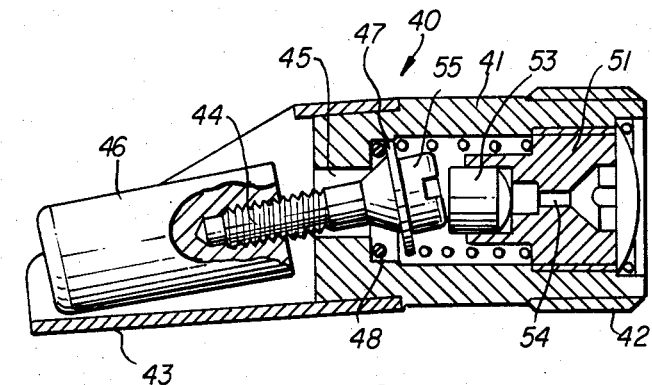

The invention will be described in detail by reference to the attached drawings in which FIGS. 1 to 3 are schematical longitudinal sections of an embodiment of a drinking valve according to the invention, FIGS. 4 to 6 are schematical longitudinal sections corresponding to those according to FIGS. 1 to 3 of a second embodiment of a drinking valve according to the invention and FIGS. 7 to 9 are schematical longitudinal sections corresponding to those according to FIGS. 1 to 3 and 4 to 6 respectively of a third embodiment of a drinking valve according to the invention.

The drinking valve shown in FIGS. 1 to 3 is a biting valve 1. It comprises a tubular valve housing 2 one end of which is provided with a thread 3 for attaching the biting valve 1 in connection to a water supply conduit. Over the end of valve housing 2 opposite to thread 3 one end of a dispensing piece 4 is attached. The dispensing piece 4 has the shape conventional in connection with biting valves and comprises a section of a tube a portion of which has been cut-away from the one end in a plane substantially through its axis of symmetry or shortly below this axis and obliquely upward to form an opening which, seen from above according to the drawing has the shape of half an ellipse, leaving an angular part surrounding the discharge end of valve housing 2. At the threaded end 3 of valve 2 normally there will be provided some sort of screen or filter as well as restriction, these conventional features not being shown on the drawing.

The valve mechanism itself comprises a valve stem 5 the free end of which extends out of the dispensing piece 4 where it may be actuated by an animal and the inner end of which is provided with a valve disk 6 which is positioned within the valve housing 2. Stem 5 extends through an opening 7 in an end wall 8 at the end of valve housing 2 enclosed by the dispensing piece 4. Between the end wall 8 and a flange 9 on stem 5 a compression spring 10 is inserted urging the valve disk 6 into sealing contact with a valve seat 11, here shown in the form of an O-ring, which in turn is supported by the inner surface of the end wall 8 around opening 7 therein. This means at the same time that stem 5 will extend right out of valve housing 2 as shown in FIG. 1.

A second valve seat 12 is provided on the side of valve disk 6 opposed to wall 8. This second valve seat 12 has a substantially centrally positioned through-hole 13. The side of this second seat 12 facing the valve disk 6 is so inclined that the spacing between the end wall 8 and this second seat is greater downwardly than upwardly when the biting valve 1 is in the position shown in FIGS. 1 to 3 which is the normal mounting position.

The side of the valve disk 6 opposite to stem 5 is provided with a conical protusion 14 the apex of which coincides with the centre line of the valve disk 6. The biting valve shown in FIGS. 1 to 3 operates in the following way: When the valve stem 5 is not actuated it extends right out as shown in FIG. 1, on the one hand, under the action of spring 10 and, on the other hand, due to the pressure of the water acting on valve disk 6. In this position the flow of water through the biting valve is completely stopped.

When an animal intends to drink it will gape about the dispensing piece 4 and subsequently close the mouth causing the palate, teeth or some other part of the mouth to depress the valve stem 5 to approximately the position shown in FIG. 2. In this position a path for the flow of water through the valve is open and the water will flow into the mouth of the animal. In a reflective reaction the animal will swallow thereby additionally pressing down valve stem 5 to the position shown in FIG. 3. As the dispensing piece is slightly inclined downwardly and outwardly, the valve stem 5 may be swung comparatively far permitting a distance of movement which may be used as compensation when the valve parts have been worn-out.

Shortly ahead of the position shown in FIG. 3 the conical protrusion 14 has started entering into hole 13. Hereby the water flow through the valve is considerably decreased and upon depression to the position shown in FIG. 3 the flow of water is completely stopped. Already the strong reduction of the flow of water while the animal is actually swallowing means that the mouth needs not receive any great amount of water and any amount of water that may be supplied may be easily retained in the mouth of the animal. This means that the valve stem 5 will be swung up and down during drinking and the animal will be supplied in portions of one draught of water at a time. As a consequence no water spillage will occur, at least not to any greater extent.

The biting valve 20 illustrated in FIGS. 4 to 6 comprises a tubular valve housing 21, one end of which is provided with a thread 22 for attachment of the biting valve 20 at a water supply conduit. Over the other end of valve housing 21 one end of a dispensing piece 23 is attached in the same way as in the embodiment according to FIGS. 1 to 3 and having the same shape as dispensing piece 4.

An actuating member 24 is provided in the dispensing piece 23 and is hingedly supported by a shaft 25 in such a way that the outer end of the actuating member may move up and down as indicated in FIGS. 4 to 6. A lever 26 extends from the shaft 25 and into the valve housing 21 through a perforated flexible end wall 27. This flexible end wall 27 tends to hold the lever in a horisontal position as shown in FIG. 4 while at the same time it permits flow of water therethrough.

A body 28 is shiftable to and fro in the valve housing 21 and by means of a compression spring 29 inserted between body 28 and a restriction 30 body 28 is biased towards lever 26. On the side facing lever 26 the body 28 has a conical depression 31 and lever 26, the free end of which has a semi-spherical shape, normally is at rest in the apex of the conical depression 31. When the actuating member 24 is depressed, the end of lever 26 is moved along the wall of depression 31 urging body 28 in the direction towards the restriction 30. A duct 32 extends from the apex of the conical depression 31 and through a tubular extension 33 the end of which is closed and has a semi-spherical outer shape. The tubular extension 33 is surrounded, on the one hand, by spring 29 and, on the other hand, by a skirt 34 which extends as a guide outwardly from restriction 30 towards body 28. A throughflow hole 35 extends through the wall of the tubular extension 33.

The function of this biting valve 20 is as follows: In the position shown in FIG. 4 the flow of water through valve 20 is stopped due to the fact that the semi-spherical end of lever 26 is at rest in the apex of the conical depression 31 whereby the out-flow from duct 32 is closed.

When an animal intends to drink the same discharge in separate draughts of water will be performed by the biting valve 20 as described in connection with the embodiment according to FIGS. 1 to 3. Thus, when the actuating member 24 has been depressed some distance, the outlet from duct 32 will be opened permitting water to flow through restriction 30, opening 35, duct 32 and the holes in the flexible end wall 27. When subsequently the actuating member 24 is additionally depressed to the position according to FIG. 6, body 28 will be additionally pressed against the restriction 30 and the spherical outer end of the tubular extension 33 will abut against restriction 30 to close or at least strongly to reduce the flow path through the reduction.

The biting valve 40 shown in FIGS. 7 to 9 has the same basic construction as the biting valves 1, 20 as described before and comprises a tubular valve housing 41, one end of which is provided with a thread for attachment of the valve 40 to a water supply conduit. As in the previously described biting valves one end of a dispensing piece 43 is attached at the other end of the valve housing 21, said dispensing piece having the same shape as the previously described dispensing pieces.

A valve stem 44 extends through a hole 45 in the end of valve housing 41 facing the dispensing piece 43 and an actuating member 46 is attached to the outer end of valve stem 44. At the inner end of valve stem 44 a valve disk 47 is attached and adapted to be urged against a sealing ring 49 supported by a shoulder 48 surrounding hole 45, said sealing ring 49 forming a valve seat and being shaped as an O-ring, the valve disk 47 being actuated by a compression spring 50 which is inserted between the valve disk 47 and a restriction 51 at the inlet end of valve housing 42.

The restriction 51 has an axially extending skirt 52 provided with holes or grooves permitting passage of water, a piston 53 being axially shiftable within this skirt 52. A hole 54 extends axially through the restriction 51 and opens centrally within the skirt 52. The side of valve disk 47 opposite to stem 44 is provied with a protrusion 55 against which piston 53 is urged by the water flowing through hole 54.

The biting valve 40 as shown in FIGS. 7 to 9 operates as follows: In the non-actuated position shown in FIG. 7 the valve disk 47 seals against the valve seat 49 whereby the flow of water through the biting valve 40 is stopped. When an animal intends to drink the same discharge in separate draughts of water from the biting valve 40 will occur as described in connection with the two previously described embodiments of the invention. Thus, when the actuating member 46 is depressed a distance as shown in FIG. 8, valve disk 47 will be swung from seat 49 and the flow path through the biting valve will be opened. When the inclination of the valve disk 47 is initiated, the protrusion 55 will urge the piston 53 in the skirt 52 in the direction towards the outlet of hole 54 and during continued inclination, when the actuating member 46 has been swung downwardly to the bottom of dispensing piece 43, the piston 53 has been urged inwardly to such an extent that it closes the outlet of hole 54 causing the flow through the valve again to be interrupted.

It is a common feature of all the valves that there may be either one or two closing positions. thus the valve shall always close when it is not actuated and for this closing a spring as shown may be used or only the pressure of the water acting against the valve disk. In the position of maximum actuation the valve normally is also closed, but this closing needs not be complete and it is also possible to provide a by-pass conduit always permitting a minimum flow through the valve as soon as it is in position of maximum actuation. In this condition, however, a substantial reduction of the flow of water through the valve is required in order that the purpose indicated initially shall be achieved.

Thus this valve and its function are based on a principle which previously has not been considered possible, namely to use the swallowing movement of the animal. Depending on the animal species the valve in its state of maximum actuation is caused either to close the flow of water or to dispense a predetermined minimum amount. This means that the valves may be permitted to have a larger discharge capacity than that corresponding to the drinking capacity of the animals without any risk for appreciable spillage.

Thus the present invention solves the cumbersome spillage problem. This solution of the problem is a valve mechanism which may be incorporated into various types of drinking valves and which has an unactuated, completely closed position and a maximum actuated closed or strongly restricted position. Between these positions the valve permits the through-flow which it is adapted to permit at maximum. The constructin is simple, reliable and cheap in production. An expert on this field will appreciate that many modifications can be performed and that the construction can be adapted to various drinking valves. Such modifications and other adaptations are intended to fall within the range of protection as defined in the attached claims.

We claim:

1. A drinking device for supplying water to animals, said device being adapted to prevent or restrict spillage of water when an animal drinks therefrom comprising a housing member including a water inlet and a water outlet, means associated with said housing member for engagement by the mouth of said animal to cause water to selectively flow from said inlet to said outlet, said engagement means including a first engagement member (4, 23, 43) and a second engagement member (5, 24, 46) movable from a neutral position towards said first engagement member when said members are simultaneously engaged by said mouth of said animal, a first valve means positioned relative to said housing member between said inlet and said outlet, said first valve means being (a) closed to prevent flow of water from said inlet to said outlet when said engagement means is in said neutral position; and (b) opened to allow continuous flow of water from said inlet to said outlet when said second member is moved a first distance towards said first member as a result of the forces generated by the contraction of the muscles of said animal's tongue and mouth when said engagement members are engaged by the mouth of said animal; and a second valve means positioned relative to said housing member between said first valve means and said inlet, said second valve means being closed when said second member is moved a further distance towards said first member as a result of the forces generated by the swallowing reflex of said animal, which reflex is released when water has flown into the mouth cavity of said animal, causing a further contraction of said muscles to so move said second member said further distance.

2. The drinking device of claim 1 wherein said first engagement member is fixed.

3. Drinking valve as claimed in claim 1 characterized in that the second engagement member (5, 24, 46) actuates a main closing valve (6, 11; 26, 32; 47, 49) to open said valve means which in turn subsequently actuates a secondary restricting or closing valve (13, 14; 33, 30; 53, 54) to close said valve means.

4. Drinking valve as claimed in claims 3 characterized in that the secondary valve (53, 54) is a piston (53) sealing against a shoulder on a primary restriction (54) for the flow path through the valve.

5. Drinking valve as claimed in claims 3 characterized in that the secondary valve (13, 14) is a conical protrusion (14) on the side of the valve disk (6) opposite to the valve stem (5), said protrusion co-operating with an opening (13) in a second valve disk.

6. Drinking valve as claimed in claim 3, characterized in that the main closing valve comprises, on the one hand, a valve disk (6, 47) from which a stem (5, 44) extends for direct or indirect actuation and, on the other hand, a valve seat (11, 49), that the main closing valve is opened by tilting the valve disk (6, 47) and that the secondary valve (13, 14; 33, 30; 53, 54) is urged to its closing or restricting position by the tilting of the valve disk (6, 47).

7. Drinking valve as claimed in claim 6, characterized in that the secondary valve (53, 54) is a piston (53) sealing against a shoulder on a primary restriction (54) for the flow path through the valve.

8. Drinking valve as claimed in claim 6, characterized in that the secondary valve (13, 14) is a conical protrusion (14) on the side of the valve disk (6) opposite to the valve stem (5), said protrusion co-operating with an opening (13) in a second valve disk.

* * * * *